US008241805B2

(12) United States Patent
Ueda et al.

(10) Patent No.: US 8,241,805 B2
(45) Date of Patent: *Aug. 14, 2012

(54) FUEL CELL SYSTEM WITH COOLING AND METHOD OF CONTROLLING THE SAME

(75) Inventors: Kenichiro Ueda, Saitama (JP); Junji Uehara, Saitama (JP); Chihiro Wake, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 12/701,155

(22) Filed: Feb. 5, 2010

(65) Prior Publication Data

US 2010/0203410 A1 Aug. 12, 2010

Related U.S. Application Data

(63) Continuation of application No. 11/492,631, filed on Jul. 24, 2006, now Pat. No. 7,682,717.

(30) Foreign Application Priority Data

Jul. 28, 2005 (JP) .................................. 2005-218324

(51) Int. Cl.
*H01M 8/04* (2006.01)

(52) U.S. Cl. ........................ 429/434; 429/436

(58) Field of Classification Search ................... 429/434, 429/436
See application file for complete search history.

(56) References Cited

U.S. PATENT DOCUMENTS

| 5,006,425 | A | 4/1991 | Takabayashi |
| 7,311,984 | B2 | 12/2007 | Ueda et al. |
| 7,682,717 | B2 * | 3/2010 | Ueda et al. ................. 429/437 |

FOREIGN PATENT DOCUMENTS

| JP | 2002-83622 | 3/2002 |
| JP | 2005-150018 | 6/2005 |
| JP | 2006-6088 | 1/2006 |

* cited by examiner

*Primary Examiner* — Stephen J. Kalafut
(74) *Attorney, Agent, or Firm* — Fish & Richardson P.C.

(57) ABSTRACT

A fuel cell system includes: a fuel cell that generates an electric power and heat by a reaction of a reaction gas; a heat exchanger; a coolant circuit for a coolant between the fuel cell and the heat exchanger; a coolant circulating pump for circulating the coolant in the coolant circuit; and a drive motor for driving the coolant circulating pump, the coolant receiving and carrying the heat to the heat exchanger by the coolant circuit, the coolant circulating pump, and the drive motor. A rotational speed of the drive motor is controlled according to an upper limit of the rotational speed of the drive motor which may be determined on the basis of a cooling capacity of the heat exchanger, a speed of the vehicle mounting the fuel cell system, a generated electric power, and a flow rate of the reaction gas.

10 Claims, 6 Drawing Sheets

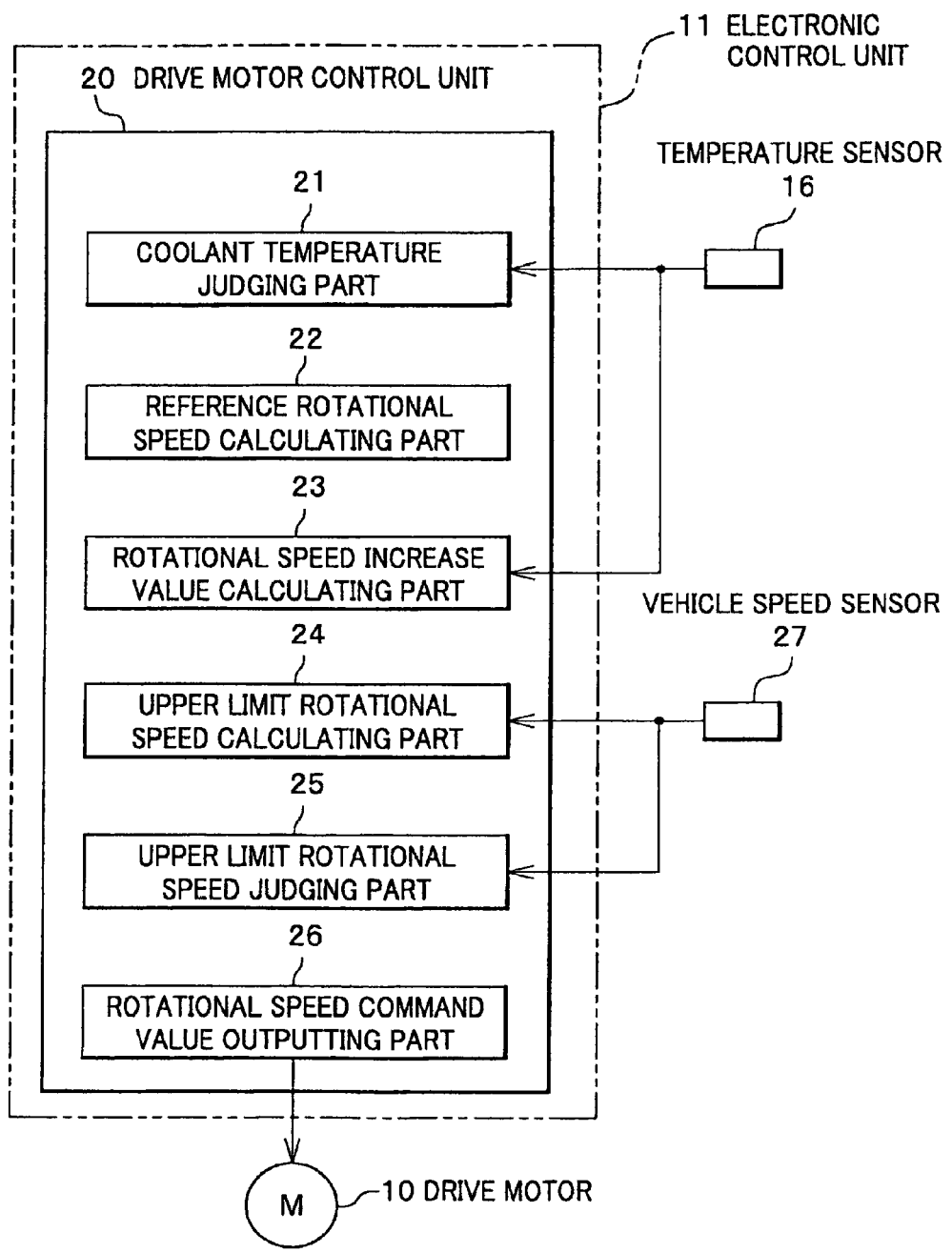

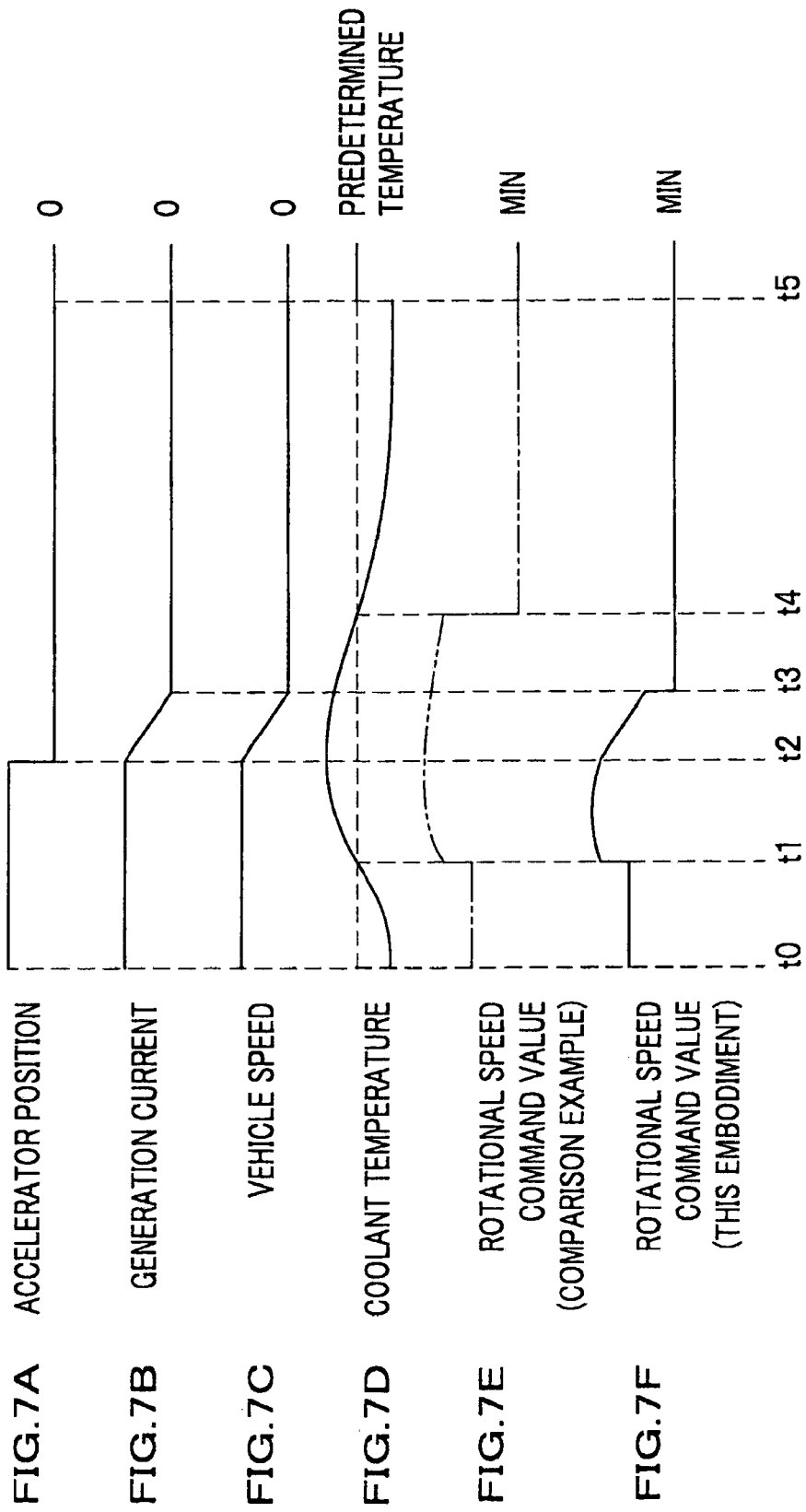

FUEL CELL SYSTEM WITH COOLING AND METHOD OF CONTROLLING THE SAME

CROSS-REFERENCE TO RELATED APPLICATIONS

This application is a continuation of and claims the benefit of priority under 35 U.S.C. §120 to U.S. application Ser. No. 11/492,631, filed Jul. 24, 2006, now U.S. Pat. No. 7,682,717. This application also claims the benefit, under 35 U.S.C. §119, of Japanese Application Serial No. 2005-218324, filed Jul. 28, 2005. Each of these prior applications is considered part of and incorporated by reference into the disclosure of this application.

BACKGROUND OF THE INVENTION

1. Field of the Invention

The present invention relates to a fuel cell system with cooling and a method of controlling the same.

2. Description of the Related Art

Fuel cells are known which include an anode (fuel electrode) and a cathode (air electrode) on both sides of a solid polymer electrolyte membrane to generate an electric power by supplying a hydrogen gas as a fuel gas to an anode side and supplying air (oxygen) as an oxidizing agent to a cathode side to provide an electrochemical reaction of these gases.

In generating the electric power, cooling water is circulated within the fuel cell to cool the fuel cell (see, for example, Japanese laid-open patent application publication No. 2002-83622 at paragraphs [0021], [0043], and FIG. 1).

In the fuel cell system disclosed in Japanese laid-open patent application publication No. 2002-83622, the cooling water is heat-exchanged at a radiator provided at a front of a fuel cell electric vehicle and is circulated within the fuel cell to cool the fuel cell that generates a heat during power generation. When a calorific value at the fuel cell is greater than a cooling capacity of the radiator, a cooling power of the radiator is maximized.

SUMMARY OF THE INVENTION

An aspect of the present invention provides a fuel cell system comprising: a fuel cell that generates an electric power and heat by a reaction of reaction gases; a heat exchanger; a coolant circuit for a coolant between the fuel cell and the heat exchanger; a coolant circulating pump for circulating the coolant in the coolant circuit; a drive motor for driving the coolant circulating pump, the coolant receiving and carrying the heat to the heat exchanger by the coolant circuit, the coolant circulating pump, and the drive motor; and a control unit that controls a rotational speed of the drive motor and changes an upper limit of the rotational speed of the drive motor to control the rotational speed of the drive motor using the upper limit.

Thus, the upper limit in the rotational speed of the drive motor can be controlled so as to change the upper limit of the rotational speed of the drive motor, so that the upper limit can be adaptively determined, although a temperature of the coolant increases due to increase in a speed of the vehicle.

A second aspect of the present invention provides the fuel cell system, wherein the control unit determines the upper limit of the rotational speed of the drive motor on the basis of a cooling capacity of the heat exchanger.

Because the rotational speed limit for the drive motor may be determined in accordance with the cooling capacity of the heat exchanger, so that the drive motor is driven at a rotational speed limit corresponding to the cooling capacity of the heat exchanger.

A third aspect of the present invention provides the fuel cell system, wherein the control unit determines the upper limit on the basis of a physical amount regarding the electric power.

Because the cooling power of the heat exchanger can be calculated on the basis of the physical amount regarding the electric power, the drive motor can be driven at a rotational speed corresponding to the physical amount regarding the electric power.

A fourth aspect of the present invention provides the fuel cell system, wherein the fuel system is mounted on a vehicle and the control unit determines the upper limit on the basis of a speed of the vehicle traveling using the electric power.

Because a cooling power of the heat exchanger may be determined on the basis of the vehicle speed of the vehicle, the drive motor can be driven at the rotational speed upper limit corresponding to the vehicle speed of the vehicle.

A fifth aspect of the present invention provides the fuel cell system, further comprising a reaction gas supplying pump for supplying one of the reaction gases to the fuel cell, wherein the drive motor drives the reaction gas supplying pump as a driving source which is common to the coolant circulating pump, and the control unit determines the upper limit of the rotational speed of the drive motor on the basis of the upper limit of a flow rate of the reaction gas to the fuel cell.

Because the single drive motor can drive the coolant circulating pump and the reaction gas supplying pump for supplying the reaction gas to the fuel cell, the drive motor can be operated at the rotational speed determined on the basis of the upper limit of the gas supplying flow rate for the reaction gas supplying pump.

A sixth aspect of the present invention provides the fuel cell system, wherein the fuel system is mounted on a vehicle and the control unit comprises a reference rotational speed determining unit that determines a reference rotational speed of the drive motor on the basis of a target generation output of the fuel cell corresponding to a speed of the vehicle, a rotational speed increase value determining unit that determines an increase value of the rotational speed of the drive motor on the basis of a temperature of the coolant, and an upper limit rotational speed determining unit that determines the upper limit of the rotational speed of the drive motor on the basis of a value selected from the group consisting of a speed of the vehicle and the electric power.

Thus, the rotational speed of the drive motor in traveling of the vehicle can be appropriately determined within an upper limit of the rotational speed of the drive motor.

BRIEF DESCRIPTION OF THE DRAWINGS

The object and features of the present invention will become more readily apparent from the following detailed description taken in conjunction with the accompanying drawings in which:

FIG. 3 is a block diagram of an electronic control unit according to the embodiment;

FIGS. 7A to 7D are time charts for illustrating operation according to the embodiment;

FIG. 7E is a time chart of a rotational speed command provided by the inventors through simulation; and FIG. 7F is a time chart of a rotational speed command according to the embodiment.

The same or corresponding elements or parts are designated with like references throughout the drawings.

DETAILED DESCRIPTION OF THE INVENTION

Prior to describing an embodiment of the present invention, the above-mentioned related art will be further argued.

In the fuel cell system disclosed in Japanese laid-open patent application publication No. 2002-83622, when a calorific value at the fuel cell is greater than the cooling capacity of the radiator, a drive motor drives a water pump at a maximum rotational speed to provide a maximum cooling power. However, because the radiator as a heat exchanger has an upper limit in a cooling power (radiating power) in design, i.e., a cooling capacity, the cooling power of the radiator increases up to a predetermined rotational speed of a drive motor for the water pump in accordance with the rotational speed of the drive motor, but does not increase and becomes constant although the rotational speed of the drive motor is increased more than the predetermined rotational speed.

Accordingly, because the rotational speed of the drive motor for driving the water pump is constant between the predetermined rotational speed and the maximum rotational speed, an electric power consumption of the drive motor for driving the water pump includes a useless part in this rotational speed range. This decreases an energy efficiency of the whole of the fuel system.

The inventors improves the energy efficiency of the whole of the a fuel cell system and a method of controlling the same by appropriately setting an upper limit of the rotational speed of the drive motor for driving the water pump (coolant circulating pump) to cut a useless power consumption although the cooling power of the radiator (heat exchange) for cooling the fuel cell is increased to the maximum.

Hereinafter will be described an embodiment of the present invention with reference to drawings.

Figure 1:
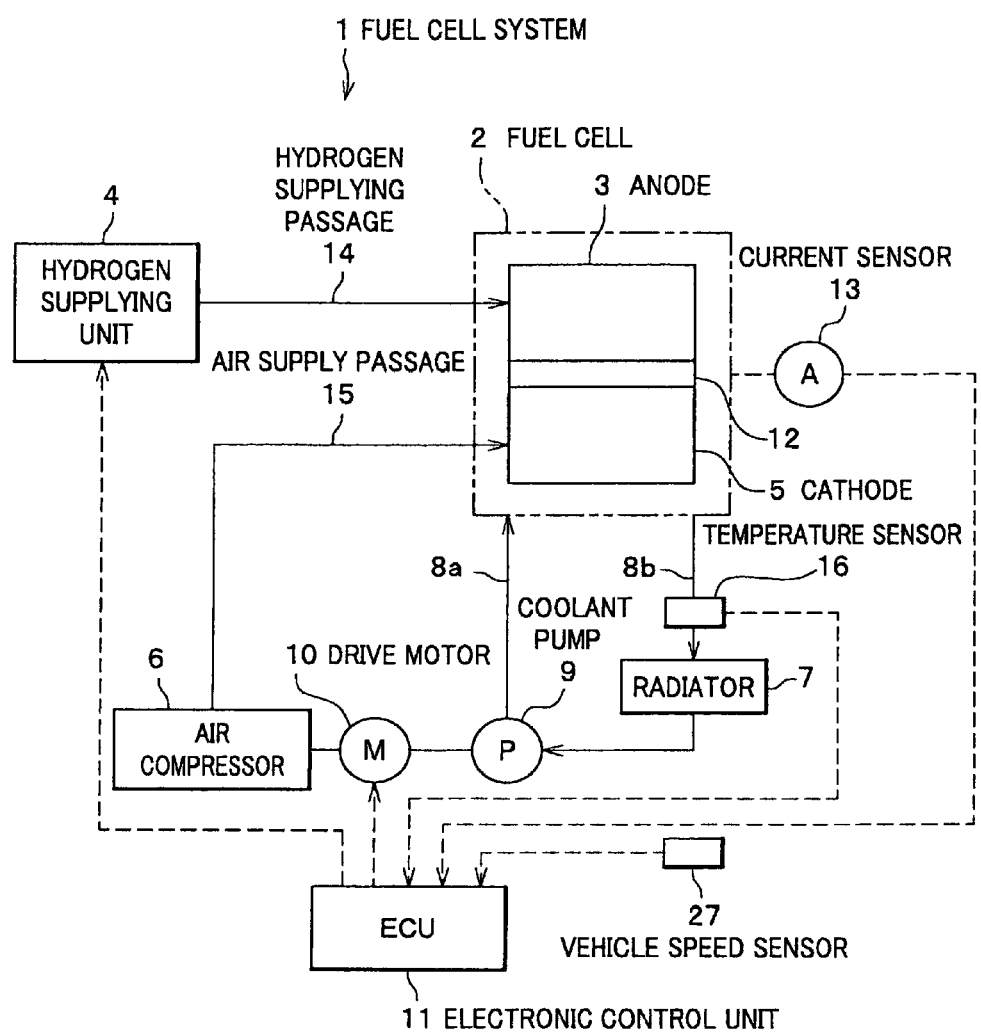
FIG. 1 is a block diagram of a fuel cell system for a vehicle according to an embodiment of the present invention.
Figure 2:
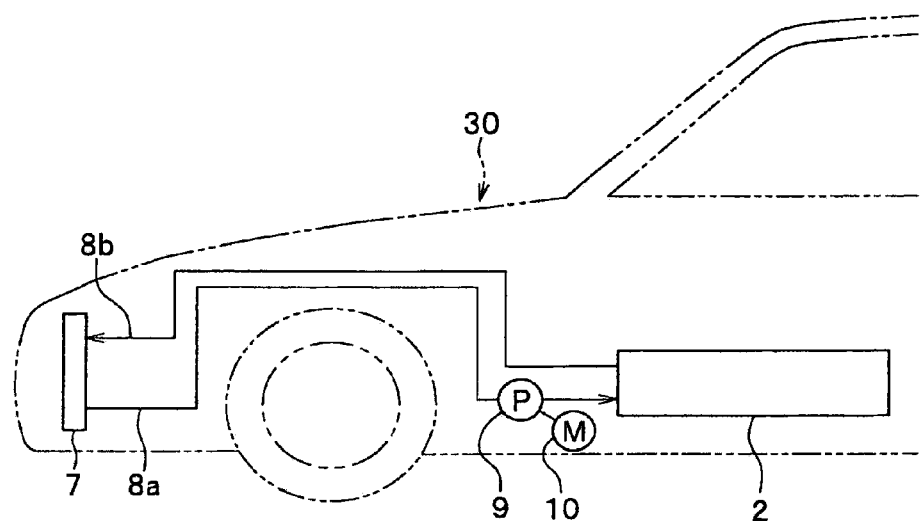
FIG. 2 is an illustration of the vehicle having the fuel cell system for the vehicle according to the embodiment.

FIG. 1 is a block diagram of a fuel cell system for a vehicle according to the embodiment of the present invention. FIG. 2 is a partial side view of the vehicle (fuel cell electric vehicle) having the fuel cell system for the vehicle according to the embodiment.

As shown in FIG. 1, the fuel cell system 1 for the vehicle according to the embodiment (hereinafter referred to as fuel cell system) mounted on the fuel cell electric vehicle 30 (see FIG. 2), mainly includes a fuel cell 2, a hydrogen supplying unit 4 for supplying hydrogen as a fuel gas to an anode 3 of the fuel cell 2, an air compressor 6 as an oxidizing gas supplying unit for supplying air as an oxidizing gas to a cathode 5 of the fuel cell 2, a radiator (heat exchanger) 7 for cooling the fuel cell 2 by circulating cooling water as a coolant within the fuel cell 2, a coolant pump 9 as a coolant circuiting pump for circulating the coolant in coolant circulating passages 8a and 8b as a coolant circulating circuit provided between the fuel cell 2 and the radiator 7, a single drive motor 10 for driving both the air compressor 6 and the coolant pump 9, and an electronic control unit (ECU) 11 for controlling the fuel cell system 1.

The fuel cell 2 mainly includes a plurality of single cells stacked, each cell including a membrane electrode assembly (MEA) provided by sandwiching a monovalent cation-exchange type of a solid polymer electrolyte membrane (hereinafter referred to as "electrolyte membrane 12" with the anode (fuel electrode) 3 and the cathode 5 (air electrode). Further, each single cell is sandwiched between a pair of electrical conductive separators (not shown) for stacking.

FIG. 1 shows, for sake of simplicity, only one cell is shown. Actually, a predetermined voltage is obtained by connecting a plurality of the single cells in series.

Each separator has channels and through holes for supplying the hydrogen gas and the air (oxygen) over the electrolyte membrane 12. The electric power is generated by an electrochemical reaction between the hydrogen supplied to the anode 3 and the air (oxygen) supplied to the cathode 5. In addition, the fuel cell 2 is provided with a current sensor 13 for detecting a generation current as a generated electric power.

The hydrogen supplying unit 4 includes a hydrogen tank (not shown) for storing hydrogen and a shutoff valve (not shown) to supply the hydrogen from the hydrogen tank to the anode 3 of the fuel cell 2 through a hydrogen supplying passage 14 by opening the shutoff valve. The air compressor 6 supplies compressed air (ambient air) to the cathode 5 of the fuel cell 2 through an air supply passage 15. In the air supplying passage 15 is provided a humidifier (not shown) for humidifying the air supplied to the cathode of the fuel cell 2.

The radiator 7 is a heat exchanger provided at a front part of the fuel cell electric vehicle 30 (see FIG. 2). The coolant in the coolant circulating passages 8a and 8b provided between the fuel cell 2 and the radiator 7 is circulated by the coolant pump 9 to cause the radiator 7 to radiate toward the atmospheric air the heat generated while the fuel cell generates the electric power. In addition, a temperature sensor 16 for detecting a temperature of the coolant from the fuel cell 2 is provided in the coolant circulating passage 8b between the fuel cell 2 and the radiator 7.

The electronic control unit 11, including a CPU (Central Processing Unit), a ROM (Read Only Memory), a RAM (Random Access Memory), and interface circuits, controls operation of the whole of the fuel cell system including an opening/closing control of the shutoff valve of the hydrogen supplying unit 4 and a drive control (rotational speed control) of the drive motor 10 for driving the air compressor 6 and the coolant pump 9. As shown in FIG. 3, the electronic control unit 11 according to the embodiment includes a drive motor control unit 20 for controlling the rotational speed of the drive motor 10 for driving the air compressor 6 and the coolant pump 9. The drive motor control unit 20 mainly includes a coolant temperature judging part 21, a reference rotational speed calculating part 22, a rotational speed increase value calculating part 23, an upper limit rotational speed calculating part 24, an upper limit rotational speed judging part 25, and a rotational speed command value outputting part 26 (will be described later in detail the rotational speed control of the drive motor 10 by the drive motor control unit 20). The air compressor 6 and the coolant pump 9 are driven by the drive motor 10 at the same rotational speed or so driven that their rotational speeds are made proportional using intervening gears and pulleys.

The coolant temperature judging part 21 judges whether the temperature of the coolant circulating within the fuel cell 2 exceeds the predetermined temperature (a threshold for judging an increase in the coolant temperature) on the basis of temperature information of the coolant from the temperature sensor 16.

Figure 4A:
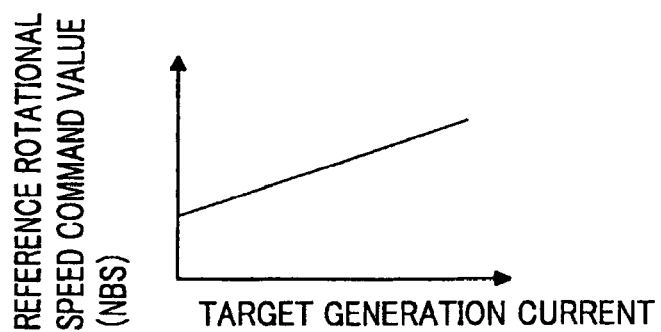
FIGS. 4A to 4C are graphical drawings illustrating control relations used in control tables according to the embodiment.

The reference rotational speed calculating part 22 previously stores, as shown in FIG. 4A, a relation between a target generation current as a target electric power corresponding to a vehicle speed (traveling speed) of the fuel cell electric vehicle (see FIG. 2) and a reference rotational speed command value NBS for the drive motor 10 in a map and calculates (determines) the reference rotational speed command value NBS from the target generation current determined with the map and an accelerator position provided by an operation of an accelerator pedal (not shown) by a driver.

Figure 4B:
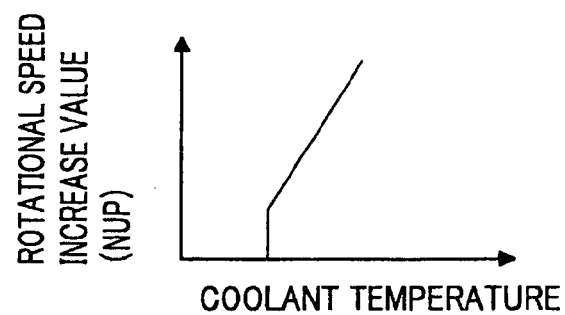

The rotational speed increase value calculating part 23 previously stores, as shown in FIG. 4B, a relation between the coolant temperature and the rotational speed increase value NUP of the drive motor 10 in a map and calculates (determines) the rotational speed increase value NUP of the drive motor 10 from the temperature information (coolant temperature) supplied from the temperature sensor 16.

Figure 4C:
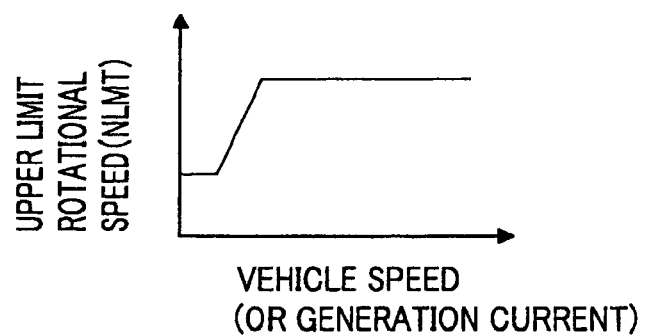

The upper limit rotational speed calculating part 24 previously stores, as shown in FIG. 4C, a relation between the vehicle speed of the fuel cell electric vehicle 30 and the upper limit rotational speed NLMT of the drive motor 10 and calculates (determines) the upper rotational speed NLMT of the drive motor 10 from the map and the vehicle speed of the fuel cell electric vehicle 20 supplied from the vehicle speed sensor 27 (see FIGS. 1 and 3). In addition, because the vehicle speed of the fuel cell electric vehicle 30 in traveling and the generation current (generated power) from the fuel cell 2 has an approximately proportional relation, the upper limit rotational speed calculating part 24 may previously store the ration between the generation current supplied from the fuel cell 2 and the upper limit of the rotational speed NLMT of the drive motor 10, and calculates (determines) the upper limit rotational speed NLMT of the drive motor 10 from the map and the generation current information supplied from the current sensor 13.

As shown in FIG. 4C, the upper limit rotational seed NLMT of the drive motor 10 becomes constant when the vehicle speed (or generation current generated by the fuel cell 2) of the fuel cell electric vehicle 30 reaches a constant value after increase. In addition, the upper limit rotational speed NLMT is not a maximum rotational speed of an actual possible rotational speed of the drive motor 10, but a rotational speed corresponding to the cooling capacity (maximum cooling power) of the radiator 7, and thus, the cooling power of the radiator 7 does not increase even though the rotational speed is increased to be more than the rotational speed upper limit NLMT.

In the embodiment, the upper limit rotational speed NLMT of the drive motor 10 may be determined on the basis of the upper limit air supplying rate (an upper limit of the gas supplying rate).

Figure 5:
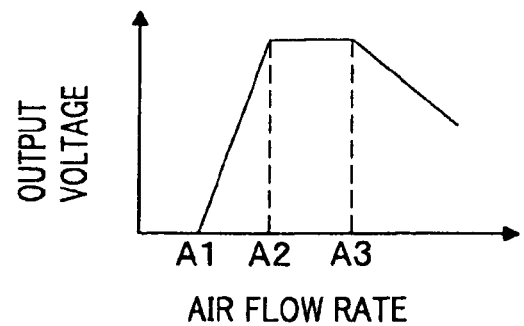
FIG. 5 is a graphical drawing illustrating a relation between an output voltage and an air flow rate of the fuel cell.

More specifically because, when the rotational speed of the air compressor 6 does not increase up to the predetermined value, the air flow rate (air supplying rate) is lower than the flow rate of the supplied hydrogen between A1 and A2, as shown in FIG. 5, an output voltage generated by the fuel cell 2 does not reach the predetermined voltage. Further, in FIG. 5, the air flow rate is appropriate for the supplied hydrogen between the air flow rates of A2 and A3 which correspond to the rotational speed of the air compressor 6. In the embodiment, the rotational speed of the coolant pump 9 varies in proportion to the rotational speed of the air compressor 6. In other words, the rotational speed of the coolant pump 9 is in proportion to that of the air compressor 6.

When the rotational speed of the air compressor 6 is actually increased to vicinity of a maximum rotational speed at which the drive motor 10 can be actually rotated, an air flow rate exceeds an increase limit of the air flow rate in the fuel cell 2 (see A3 in FIG. 5). When the air flow rate exceeds the increase limit (A3 in FIG. 5), the humidifier (not shown) provided in the air supply passage 15 is supplied with an excessive air of which flow rate exceeds the humidifying capacity of the humidifier, humidifying cannot be provided sufficiently.

Even in such a case, as mentioned above, when the upper limit rotational speed NLMT of the drive motor 10 is set on the basis of the upper limit air supplying rate of the air compressor 6, the humidifier (not shown) provided in the air supplying passage 15 can be supplied with an appropriate flow rate of the air.

The upper limit rotational speed judging part 25 judges whether the rotational speed of the drive motor 10 when the temperature of the coolant exceeds the predetermined temperature (the threshold for judging the increase in the coolant temperature) is set to the upper limit rotational speed NLMT corresponding to the vehicle speed (or generation current) or any rotational speed lower than the upper limit rotational speed NLMT, on the basis of the map shown in FIG. 4C and the vehicle speed information supplied from the vehicle speed sensor 27 (or the generation current information supplied from the current sensor 13).

The rotational speed command value output part 26 supplies a rotational speed command value set in accordance with the rotational speed control (mentioned later) for the drive motor 10 shown in FIG. 6 to rotate the drive motor 10 at a predetermined rotational speed.

Next, will be described an operation in a general power generation operation of the fuel cell system 1. First, upon turning on an ignition of the fuel cell electric vehicle 30 (see FIG. 2), the shutoff valve (not shown) of the hydrogen supplying unit 4 is opened in response to the signal from the electronic control unit 11, and the air compressor 6 and the coolant pump 9 is operated (turn on) by operating the drive motor 10.

This supplies the hydrogen in the hydrogen tank (not shown) of the hydrogen supplying unit 4 to the anode 3 of the fuel cell 2 through the hydrogen supplying passage 14. On the other hand, the air humidified by the humidifier (not shown) is supplied through the air supply passage 15 to the cathode 5 of the fuel cell 2. This generates the electric power by the electrochemical reaction between the hydrogen supplied within the fuel cell 2 and the oxygen being humidified, supplying the electric power (generation current) to loads such as the traveling motor (not shown) for driving wheels of the fuel cell electric vehicle 30. The traveling motor (not shown) drives the fuel cell electric vehicle 30.

A hydrogen off gas exhausted from the anode 3 of the fuel cell 2 in the power generation is returned to the hydrogen supplying passage 14 to be recycled after water is separated. In addition, an air off gas including much humidity exhausted from the cathode 5 of the fuel cell 2 in generation is exhausted to external.

In the power generation, the coolant pump 9 is driven by the driving motor 10 to circulate the coolant between the fuel cell 2 and the radiator 7 through the coolant circulating passages 8a and 8b to cool the fuel cell 2 by radiating the heat generated in the fuel cell 2 through the coolant and the radiator 7. Here, as the electric power (generation current) generated by the fuel cell 2 becomes larger, i.e., as the vehicle speed (traveling speed) of the fuel cell vehicle 30 becomes faster, the temperature of the coolant circulating within the fuel cell 2 increases by the heat generated in the fuel cell. Thus, the rotation speed of the drive motor 10 driving the coolant pump 9 is increased in accordance with an increase in the temperature of the coolant to make the circulation of the coolant supplied to the radiator 7 faster.

Hereinafter, will be described with reference to FIGS. 6 and 7A to 7F, the rotational speed control of the driving motor 10 in the power generation of the fuel cell 2 (further referring to FIGS. 1 to 4). FIG. 6 is a flowchart describing the rotational speed control by the control unit (drive motor control unit) 20 for the drive motor 10 and FIG. 7A to 7E are time charts in the rotation speed controlling of the drive motor shown in FIG. 6.

The traveling motor for driving wheels (not shown) of the fuel cell electric vehicle 30 is supplied with the electric power (generation current) generated by supplying the hydrogen and the air (oxygen) to the fuel cell 2 to drive the vehicle at a desired vehicle speed. During this, the reference rotational speed calculating part 22 calculates (determines), in a step S1, the reference rotational speed command value NBS on the basis of the stored map (see FIG. 4A) and the target generation current determined by an accelerator position determined by a position of the accelerator pedal depressed by the driver. The coolant temperature judging part 21 judges, in a step S2, whether the coolant temperature exceeds the predetermined temperature (the threshold for judging the increase of the coolant temperature) on the basis of the temperature information of the coolant from the temperature sensor 16. If the coolant temperature 5 the predetermined temperature (No, in the step S2), because the coolant temperature is in the general coolant temperature range, a process in the rotational speed increase value calculating part 23 proceeds to a step S5 after setting the rotational speed increase value NUP for the drive motor 10 to zero in a step S3.

More specifically, between time t0 and time t2 in FIG. 7A, the accelerator position of the fuel cell electric vehicle 30 (target generation current for the traveling motor (not shown)) is kept constant at a given value. In accordance with this, the generation current of the fuel cell 2 and the vehicle speed are maintained at given values, respectively. After this, the coolant temperature progressively increases as the power is generated. At time t1, the coolant temperature exceeds the predetermined temperature (the threshold for judging the increase in the coolant temperature). As described above, because the coolant temperature is smaller than the predetermined temperature between the time t0 and the time t1, the reference rotational speed command value NBS based on the map (see FIG. 4A) stored in the reference rotational speed calculating part 22 is supplied to the drive motor 10 to drive the coolant pump 9 and the air compressor 6.

On the other hand, if the coolant tempter>the predetermined temperature (Yes, in the step S2), the rotational speed increase value calculating part 23 calculates (determines), in a step S4, the rotational speed increase value NUP for the reference rotational speed command value NBS calculated in the step S1 from the stored map (see FIG. 4B) and the temperature information (coolant temperature) of the coolant supplied from the temperature sensor 16 at present.

The upper limit rotational speed calculating part 24 calculates (determines), in a step S5, the upper limit rotational speed NLMT for the drive motor 10 from the stored map (see FIG. 4C) and the vehicle speed information at that time from the vehicle speed sensor 27. In addition, as described above, the upper limit rotational speed calculating part 24 may store the relation between the generation current supplied from the fuel cell 2 and the upper limit rotational speed NLMT of the drive motor 10 in the map and calculate the upper limit rotational speed NLMT of the drive motor 10 at that time from the map (see FIG. 4C) and the generation current information supplied from the current sensor 13. The upper limit rotational speed judging part 25 judges, in a step S6, whether a sum of the reference rotational speed command value NBS calculated in the step S1 and the rotational speed increase value NUP calculated in the step S3 or the step S4 (NBS+NUP) exceeds the upper rotational speed NLMT of the drive motor 10 calculated in the step S5.

If NBS+NUP≦NLMT in the step S6 (No, in the step S6), the rotational speed command value outputting part 26 sets, in a step S7, the rotational speed command value for the drive motor 10 to NBS+NUP.

On the other hand, NBS+NUP>NLMT (Yes, in the step S6), the rotational speed command value output part 26 determines, in a step S8, the rotational speed command value for the drive motor 10 to NLMT.

Will be described operation in the steps from the steps S6 to S8 more specifically. It is assumed that the fuel cell electric vehicle 30 is traveling at a predetermined vehicle speed, and thus, at the time t1 in FIG. 7D, the coolant temperature exceeds the predetermined temperature (the threshold for judging the increase in the coolant temperature), and between the time t0 and the time t2, the accelerator position of the fuel cell electric vehicle 30 (the target generation current for the traveling motor (not shown)) is kept at a given constant value. In accordance with this, the generation current of the fuel cell 2 and the vehicle speed are maintained at given values, respectively.

Accordingly, between the time t1 to the time t2, just after time t1, because the rotational speed increase value NUP is still small, it corresponds to the case of NBS+NUP≦NLMT (No, in step S6) and thus, the rotational speed command value is set to NBS+NUP in the step S7. Then, the rotational speed command value output part 26 supplies NBS+NUP as the rotational speed command value for the drive motor 10. When NBS+NUP>NLMT (Yes, in the step S6) as the rotational speed increase value NUP becomes large as the coolant temperature increases, the rotational speed command value is set, in a step S8, to NLMT. Then, the rotational speed command value output part 26 outputs the rotational speed command value as the rotational speed command value for the drive motor 10. As described above, between the time t1 and the time t2, if the coolant temperature exceeds the predetermined temperature (the threshold for judging the increase in coolant temperature), the rotational speed command value is set to the upper limit rotational speed NLMT determined in accordance with the vehicle speed.

Further, between the time t2 and time t5 in FIG. 7A, the accelerator position of the fuel cell electric vehicle 30 becomes zero and the vehicle speed becomes zero after the time t3. In the event, between the time t2 to the time t3, the generation current and the vehicle speed decrease and are kept zero between the time t3 and the time t5.

In the event, the coolant temperature gradually decreases and becomes lower than the predetermined temperature at time t4.

Thus, between the time t2 and the time t3, the upper limit rotational speed NLMT of the drive motor 10 becomes smaller as decrease in the vehicle speed (or generation current) (see FIG. 4C). Accordingly, because between the time t2 to the time t3 the upper limit rotational speed NLMT becomes gradually smaller, if NBS+NUP>NLMT (Yes in the step S6), the rotational speed command value is set to NLMT in the step S8, and the rotational speed command value output part 26 supplies NLMT as the rotational speed command value for the drive motor 10. As described above, between the time t2 and the time t3 although the coolant temperature exceeds the predetermined value (the threshold for judging the increase in the coolant temperature), the rotational speed command value for the drive motor 10 is determined as the upper limit rotational speed NLMT which becomes smaller as decrease in the vehicle speed (or the generation current).

Further, because between the time t3 and time t4 the vehicle speed (or the generation current) is kept zero although the coolant temperature exceeds the predetermined value (coolant temperature increase judging threshold), the upper limit rotational speed NLMT determined by the vehicle speed is kept in a small value state (minimum). Accordingly, because between the time t3 and the time t4 as shown in FIG. 7C the upper limit rotational speed NLMT is also kept in the small value state (minimum value), the status is in the case of NBS+NUP>NLMT (Yes, in the step S6), and thus, the rotational speed command value is set to NLMT in the step S8. Then, the rotational speed command value output part 26 supplies NLMT as the rotational speed command value for the drive motor 10. Further, because between the time t4 and the time t5 in FIG. 7C the vehicle speed (or the generation current) is kept zero, the upper limit rotational speed NLMT determined by the vehicle speed is kept in a small value state (minimum).

As described above, although the coolant temperature exceeds the predetermined value (the threshold for judging an increase in the coolant temperature) between the time t1 and the time t4, in the embodiment, the rotational speed of the drive motor 10 can be appropriately controlled with the rotational speed command value corresponding to the upper limit rotational speed NLMT determined on the basis of the vehicle speed (or the generation current) as shown in FIG. 7F. In other words, in the fuel cell system 1 according to the embodiment in which the air compressor 6 and the coolant pump 9 are driven by the same driving motor 10, because the upper limit rotational speed NLMT for the drive motor 10 is set on the basis of the vehicle speed (or the generation current), when the coolant temperature increases, the cooling power can be increased by increase in the rotational speed of the coolant pump 9 without decrease in a power generation performance of the fuel cell 2 caused by excessively increasing the rotational speed of the drive motor 10 (excessively increasing the rotational speed of the air compressor 6). Thus, decrease in the output of the fuel cell 2 can be prevented without decrease in durability of the fuel cell 2, particularly, the membrane electrode assembly.

Figure 6:
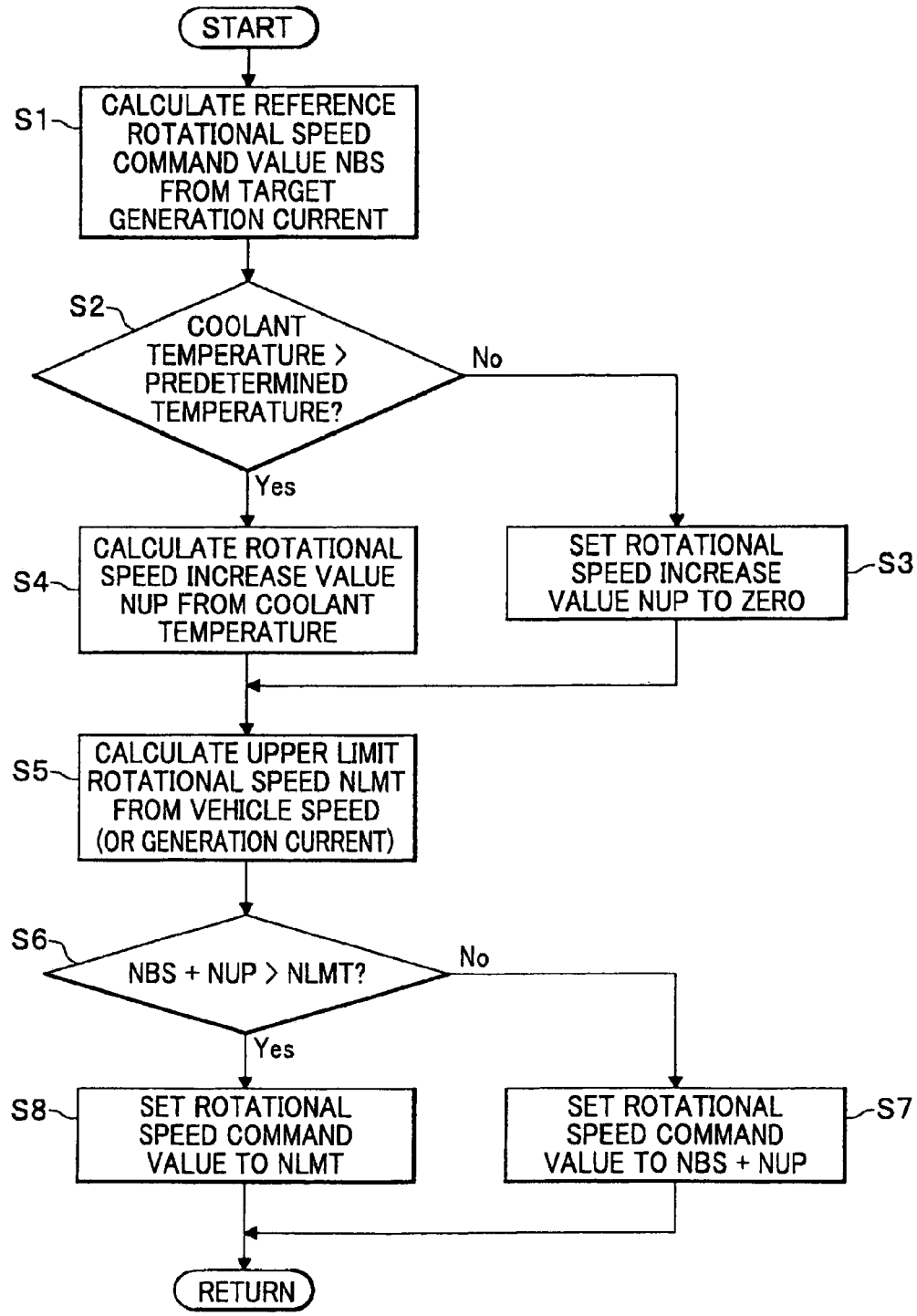
FIG. 6 is a flowchart of a rotational speed control for a drive motor according to the embodiment.

FIG. 7E shows a comparison example, of the rotational speed control obtained by the inventors through a simulation using the process shown in FIG. 6 in which the steps S5 to S8 are omitted. In the comparison example shown by a chain double-dashed line in FIG. 7F, when the coolant temperature exceeds the predetermined value (the threshold for judging the increase in the coolant temperature), the rotational speed of the drive motor 10 is controlled by the rotational speed command value such that the rotational speed of the drive motor 10 is increased to vicinity of the actually possible maximum rotational speed. In this case, although the drive motor 10 is driven at the maximum rotational speed exceeding the upper limit rotational speed NLMT, the cooling power of the radiator is kept approximately constant. Thus, the power consumption increases when the drive motor 10 is operated at the maximum rotational speed, which results in a lower efficiency of the whole of the fuel cell system.

According to the fuel cell system for the vehicle and the method of controlling the same, the upper limit of the rotational speed of the drive motor can be appropriately set accordingly although a temperature of the coolant increases when the speed of the vehicle is increased in traveling. Accordingly, this prevents the drive motor from being driven at the maximum rotational speed to eliminate useless power consumption with an improved efficiency of the whole of the fuel cell system for a vehicle.

As mentioned above, in the fuel cell system according to the present invention, the electronic control unit 11 determines the upper limit of the rotational speed of the drive motor on the basis of a cooling capacity of the heat exchanger, a physical amount regarding the electric power (for example, the speed of the vehicle traveling using the electric power), and/or a flow rate of the reaction gas.

The fuel cell system used in the vehicle has been described. However, this system is applicable to ships, aircraft, and fixed type apparatuses for home use and industrial use.

The invention claimed is:

1. A fuel cell system comprising:
a fuel cell that generates an electric power and heat by a reaction of reaction gases;
a heat exchanger;
a coolant circuit for a coolant between the fuel cell and the heat exchanger;
a coolant circulating pump for circulating the coolant in the coolant circuit;
a drive motor for driving the coolant circulating pump, the coolant receiving and carrying the heat to the heat exchanger by the coolant circuit, the coolant circulating pump, and the drive motor; and
a control unit that controls a rotational speed of the drive motor and changes an upper limit of the rotational speed of the drive motor to control the rotational speed of the drive motor using the upper limit; and
a reaction gas supplying pump for supplying one of the reaction gases to the fuel cell,
wherein the drive motor drives the reaction gas supplying pump as a driving source which is common to the coolant circulating pump, and the control unit determines the upper limit of the rotational speed of the drive motor on the basis of the upper limit of a flow rate of the reaction gas to the fuel cell.

2. The fuel system as claimed in claim 1, wherein the control unit determines the upper limit of the rotational speed of the drive motor on the basis of a cooling capacity of the heat exchanger.

3. The fuel system as claimed in claim 1, wherein the control unit determines the upper limit on the basis of a physical amount regarding the electric power.

4. The fuel system as claimed in claim 3, wherein the fuel system is mounted on a vehicle and the control unit determines the upper limit on the basis of a speed of the vehicle traveling using the electric power.

5. The fuel system as claimed in claim 1, wherein the fuel system is mounted on a vehicle and the control unit comprises a reference rotational speed determining unit that determines a reference rotational speed of the drive motor on the basis of a target generation output of the fuel cell corresponding to a speed of the vehicle, a rotational speed increase value determining unit that determines an increase value of the rotational speed of the drive motor on the basis of a temperature of the coolant, and an upper limit rotational speed determining unit that determines the upper limit of the rotational speed of the drive motor on the basis of one of a speed of the vehicle and the electric power.

6. A method of controlling a fuel cell system including: a fuel cell that generates an electric power and heat by a reaction of reaction gases; a heat exchanger; a coolant circuit for a coolant between the fuel cell and the heat exchanger; a coolant circulating pump for circulating the coolant in the coolant circuit; and a drive motor for driving the coolant circulating pump, the coolant receiving and carrying the heat to the heat exchanger by the coolant circuit, the coolant circulating pump, and the drive motor; the method comprising the steps of:

(a) controlling a rotational speed of the drive motor; and (b) changing an upper limit of the rotational speed of the drive motor to control the rotational speed of the drive motor using the upper limit;

(c) supplying one of the reaction gases to the fuel cell with a reaction gas supplying pump driven by the drive motor which is a common driving source to the coolant circulating pump; and (d) determining the upper limit of the rotational speed of the drive motor on the basis of the upper limit of a flow rate of the reaction gas to the fuel cell.

7. The method as claimed in claim 6, further comprising the step of: determining the upper limit of the rotational speed of the drive motor on the basis of a cooling capacity of the heat exchanger.

8. The method as claimed in claim 6, further comprising the step of determining the upper limit on the basis of a physical amount regarding the electric power.

9. The method as claimed in claim 8, wherein the fuel system is mounted on a vehicle, the method further comprising the step of: determining the upper limit on the basis of a speed of the vehicle traveling using the electric power.

10. The method as claimed in claim 6, wherein the fuel system is mounted on a vehicle, the method further comprising the steps of: determining a reference rotational speed of the drive motor on the basis of a target generation output of the fuel cell corresponding to a speed of the vehicle; determining an increase value of the rotational speed of the drive motor on the basis of a temperature of the coolant; and determining the upper limit of the rotational speed of the drive motor on the basis of one of a speed of the vehicle and the electric power.

* * * * *